United States Patent

Gowda

[11] Patent Number: 5,992,948
[45] Date of Patent: Nov. 30, 1999

[54] PLASTIC PISTON

[75] Inventor: Padmanab Lakshman Gowda, Troy, Mich.

[73] Assignee: ITT Manufacturing Enterprises Inc., Wilmington, Del.

[21] Appl. No.: 08/843,194

[22] Filed: Apr. 14, 1997

[51] Int. Cl.[6] .................................................. B60T 8/40
[52] U.S. Cl. ...................................................... 303/116.1
[58] Field of Search .................... 303/116.1, DIG. 11; 29/890.06; 138/30, 31

[56] References Cited

U.S. PATENT DOCUMENTS

| | | | |
|---|---|---|---|
| 4,351,869 | 9/1982 | Cresap | 428/121 |
| 4,432,883 | 2/1984 | Denzine et al. | 252/12 |
| 4,689,098 | 8/1987 | Gaughan | 156/62.2 |
| 5,290,120 | 3/1994 | Osterfeld et al. | 403/133 |
| 5,484,194 | 1/1996 | Reinartz et al. | 303/116.2 |

*Primary Examiner*—Robert J. Oberleitner
*Assistant Examiner*—Jeffrey Woller
*Attorney, Agent, or Firm*—Rader, Fishman & Grauer PLLC

[57] ABSTRACT

A high pressure accumulator is disclosed which includes a housing having walls defining a chamber and a piston residing in the chamber. The piston is comprised of polyphenylene sulfide and preferably includes a head portion and wall portions extending away from the head portion. The wall portions preferably include outer and inner surfaces which are oblique. Preferably the polyphenylene sulfide includes glass fibers and minerals and is formed using injection molding techniques. The material composition of the piston and its geometrical definition give it the ability to operate when exposed to the brake fluid and when exposed to operating pressures is the range of 100 bars.

20 Claims, 3 Drawing Sheets

PLASTIC PISTON

TECHNICAL FIELD

This application relates to pistons and more particularly relates to pistons used in hydraulic applications.

BACKGROUND OF THE INVENTION

Great advances have recently been made in the use of plastics in high stress applications. The use of plastics is no longer limited to low stress applications and they are finding their way into components which, in the recent past, were only constructed from metals or the like. However, there still are a number of extremely high stress applications which plastics have not found application. One of these applications includes pistons used in high pressure designs such as the high pressure circuit lines of anti-lock brake systems ("ABS") and the like. More specifically, while it is common to use plastic pistons in low pressure accumulators found in many ABS designs, there is no system to date which utilizes plastic pistons in the high pressure circuits of ABS designs. The zero to five bar pressure deviations typical in the low pressure circuits of ABS designs are easily handled by components formed from plastic; however, the high pressure circuits of ABS designs are often exposed to twenty times the pressure (100 bars of pressure) of that of the low circuit, or greater. Heretofore, plastic components such as plastic pistons and plastic accumulators, have not been able to withstand the forces associated with such high pressures and accordingly, components in the high pressure circuits of ABS have been fabricated only from various metals.

An object of the invention is to provide a piston having a geometry and a composition which allows it to withstand the forces present in the high pressure circuit of an ABS.

A further object of the present invention includes an ABS having a high pressure accumulator which includes a piston comprised of plastic.

SUMMARY OF THE INVENTION

The invention includes in one aspect, a high pressure accumulator for use in anti-lock brake systems. The high pressure accumulator includes a housing having walls extending therefrom which define a chamber and a piston which resides in the chamber and is comprised of polyphenylene sulfide. In a preferred embodiment the polyphenylene sulfide includes glass fibers and minerals.

A preferred geometry of the piston includes a head portion and wall portions extending away from the head portion wherein the wall portions define an inner chamber. In one embodiment the inner chamber includes a spring residing therein and in a second embodiment a spring is disposed around an outer surface of the wall portion and rests against a radially extending flange.

Preferably the wall portion includes oblique inner and an outer surfaces. Preferably, the inner surface generally defines a void having an oblate, semi-spherical geometry.

In a second aspect the present invention includes an anti-lock brake system comprising a master cylinder, at least one wheel cylinder having a hydraulic port, a hydraulic connection between the master cylinder and the hydraulic port of the wheel cylinder, a pump having a suction side and a high pressure side wherein the suction side is hydraulically connected to the hydraulic port of the wheel cylinder, a high pressure accumulator hydraulically connected to the high pressure side of the pump, wherein the high pressure accumulator includes a housing having walls defining a chamber and a piston residing in the chamber wherein the piston is comprised of polyphenylene sulfide.

DETAILED DESCRIPTION OF THE PREFERRED EMBODIMENTS

Figure 1:
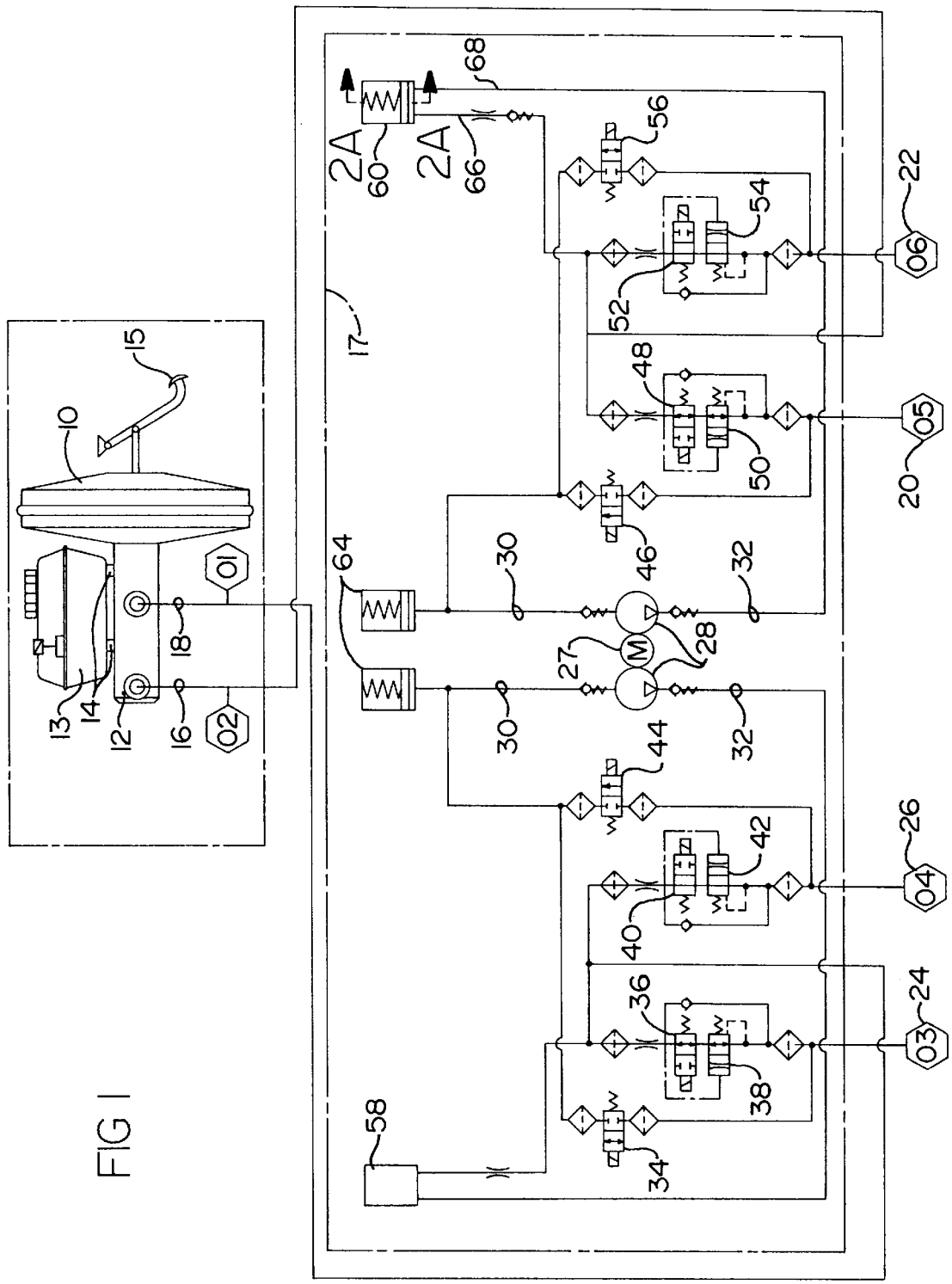
FIG. 1, is a Schematic of the hydraulic ABS of the present invention.

Now referring to FIG. 1, the ABS of the present invention includes vacuum assist booster 10 which is coupled to master cylinder 12. Hydraulic reservoir 13 is hydraulically coupled to master cylinder 12 by way of hydraulic connection 14. Master cylinder 12 is of the dual chamber type having a front pressure chamber and a rear pressure chamber (chamber not shown). The front pressure chamber is hydraulically connected to output port 16 which is hydraulically connected to the secondary circuit (through network 17) consisting of wheel cylinders 20, 22 of two respectively associated vehicle wheels. Rear pressure chamber of master cylinder 12 is connected to the primary circuit consisting of two wheel cylinders 24, 26 by way of hydraulic connection 18 (through network 17).

When the ABS of FIG. 1 is in a non-active operating mode, wheel cylinders 20–26 are under direct operator control and any force exerted on brake pedal 15 by the vehicle operator will result in a proportional pressure increase within wheel cylinders 20–26. When one or more of the wheels associated with wheel cylinders 20–26 "lockup" during an operator initiated braking maneuver, the ABS of FIG. 1, under the control of an ABS central controller (central controller not shown) releases pressure from one or more wheel cylinders 20–26 to allow one or more wheel associated with wheel cylinders 20–26 to rotate. This rotation allows the vehicle operator to control the direction of vehicle movement simultaneously with decelerating the vehicle. The mechanism that allows a vehicle wheel to rotate (even though the vehicle operator has actuated pedal 15 to such a degree that at least one wheel cylinder 20–26 has stopped its respectively associated wheel from rotating) is outlet valves 34, 44, 46, 56 and motor 27 which is coupled to pump 28. When the ABS system is in an active operating mode (i.e. during an ABS brake maneuver) release valves 34–56 are activated by the ABS controller (not shown) such that hydraulic lines 16, 18 are hydraulically cut off from wheel cylinders 20–26 and input line 30 of pump 28 is hydraulically connected to the hydraulic port of wheel cylinders 20–26. Thus, when the system is in an active ABS brake mode, the high hydraulic pressure at one or more of the wheel cylinder(s) 20–26, is allowed to flow to the respectively associated low pressure accumulator 62, 64 thereby lowering the hydraulic pressure in the circuit and causing hydraulic cylinders 20–26 to decrease the force they are exerting (thereby terminating the wheel lockup condition).

High pressure accumulator 60 is required in only one of the primary and secondary braking circuits. Accumulator 58 is not a high pressure accumulator but merely a chamber filled with hydraulic fluid to dampen the hydraulic impulses caused by the pump when it enters an active ABS brake mode.

The function of high pressure accumulator 60 is primarily to store or accumulate a sufficient amount of hydraulic fluid during an active ABS brake maneuver such that the sensitive lip portions of the seals within master cylinder 12 are not adjacent the compensation ports within the master cylinder 12. If such a condition were permitted to occur, they would be forced into the compensation ports and would be prone to tearing. Thus, high pressure accumulator 60 primarily performs a lip seal preservation function and is also known as a lip seal saver accumulator. This potential problem associated with destroying the sensitive sealing lips on the ends of seals found within the master cylinder is well documented in the literature associated with ABS and accordingly is well known to those skilled in the art.

As was set forth earlier, low pressure accumulators 62, 64 will typically be exposed to pressures in the range of zero to five bars (approximately 0 to 75 psi). In contrast, the pressures exerted on high pressure accumulator 60 can easily reach the 100 bar range (1500 psi) or greater. Although plastics have been successfully used in fabricating the pistons found within low pressure accumulators 62, 64 there heretofore has been no system which has used plastic pistons within high pressure accumulator 60. The design of the present invention which makes plastics suitable for use in pistons of high pressure accumulator 60 will now be discussed in conjunction with FIGS. 2A, 2B, 2C, and 3.

Figure 2A:
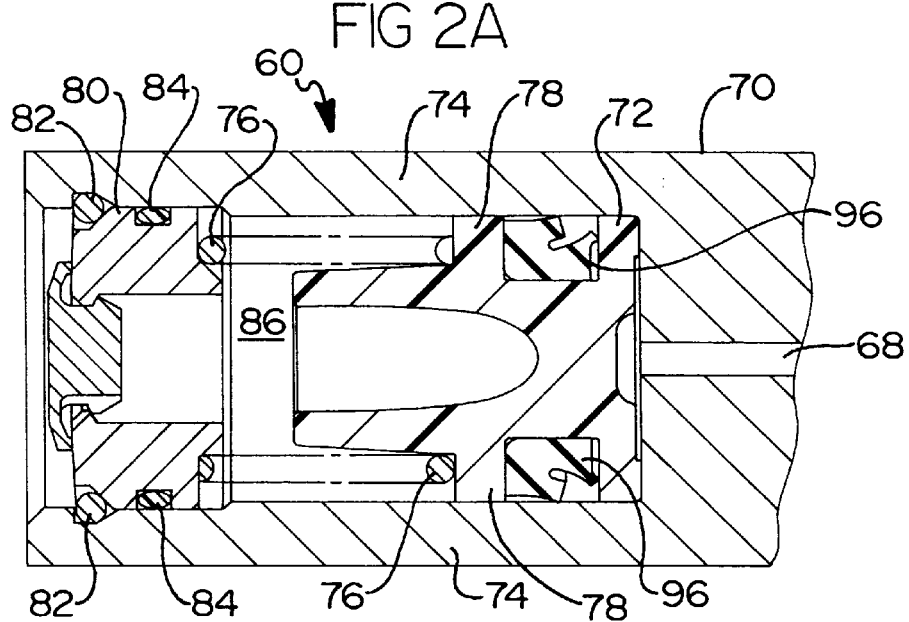
FIG. 2A, is a cross sectional view taken substantially along lines 2A—2A of FIG. 1 and depicts a first embodiment of the high pressure accumulator of the present invention.

Now referring to FIG. 2A, high pressure accumulator 60 is comprised of housing 70 and piston 72. Housing 70 includes walls 74 which define chamber 86 wherein piston 72 resides. Spring 76 is lodged between radially extending flange 78 and cap 80. Cap 80 is hydraulically sealed within walls 74 by way of O-ring seal 84 and retained in housing 70 by retaining ring 82. Walls 74 and cap 80 form chamber 86 of housing 70.

Figure 2B:
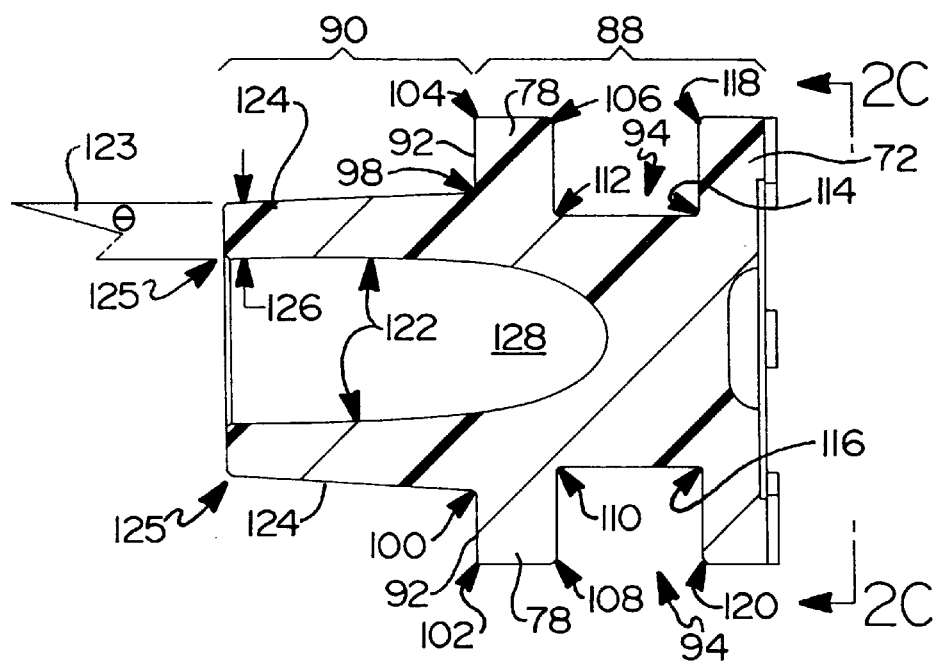
FIG. 2B, is an enlarged, cross-sectional view of the piston portion of the hydraulic accumulator of FIG. 2A.
Figure 2C:
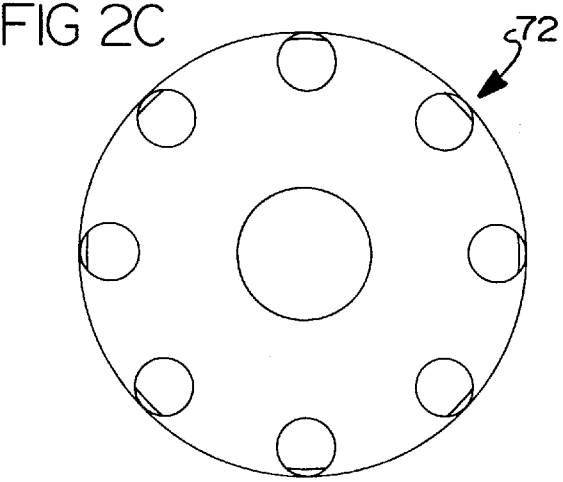
FIG. 2C, is a front elevational view taken substantially along lines 2C—2C of FIG. 2B.

Now referring to FIG. 2A, 2B, and 2C, piston 72 preferably includes head portion 88 and wall portion 90. Radially extending flange 78 forms a radial surface 92 which is used to abut spring 76. Head 88 preferably includes annular recess 94 for accommodating the presence of seal 96. Preferably corners 98–120 are radiused to impede the generation or propagation of stress fractures.

Walls 90 of piston 72 are defined by inner surface 122 and outer surface 124. Preferably inner surface 122 slopes 123 toward outer surface 124 thereby causing walls 90 to increasingly narrow (or taper) 126 toward distal end 125 of walls 90. This forms an oblique relationships between surfaces 122 and 124. This oblique relationship facilitates removal of piston 72 from the injection die. Inner surface 122 of walls 90 preferably define void 128 having an oblate, semi-spherical geometry.

The preferred material for fabricating piston 72 is polyphenylene sulfide ("pps") and the preferred method of fabrication is injection molding. During the development and testing phase of designing piston 72, three different pps materials were tested. Two of the three materials were purchased from Hoechst Celanese Corporation, 26 Main Street, Chatham, N.J. 07928, (201) 635-2600, and the third pps material which was tested was purchased from LNP Engineering Plastics, 475 Creamery Way, Exton, Pa. 19341, (601) 363-4500. The above two manufacturers list the strength characteristics of their pps materials as follows:

|  | CELANESE FORTRON 6850 L6 | CELANESE FORTRON 4184 | LNP THERMOCOMP 0F100-10 |
| --- | --- | --- | --- |
| TENSILE STRENGTH | 18,000 psi | 21,000 psi | 24,500 psi |
| FLEXURAL STRENGTH | 28,000 psi | 30,400 psi | 35,000 psi |
| IMPACT STRENGTH (UN-NOTCHED) | 11.0 ft.-lb/in. | 7.0 ft.-lb/in. | 12 ft.-lb/in. |
| MATERIAL COMPOSITION (BY VOLUME) | 20% GLASS FIBER 30% MINERAL 50% pps | GLASS FIBER AND MINERAL FILLED pps (% NOT DISCLOSED BY MANUFACTURER) | 50% GLASS FIBERS 50% pps |

Of the three above referenced materials the LNP THERMOCOMP 0F100-10 passed the burst test and the endurance test and the Fortron 6850L6 failed the burst test (no further testing was done on the Fortron 6850L6). The Fortron 4184 passed the burst test but failed the endurance test. The burst test consisted of the following steps:

Burst Test

The burst test was performed by assembling the piston in a fixture which has the same bore as the valve block in which the piston will be inserted when used in a production ABS unit.

The test apparatus consists of a fluid pump which generates air pressure up to 15 bar. The air pressure is applied to a hydraulic cylinder where the pressure is amplified several times to generate the very high pressures required for this test. A pressure relief valve is provided in the hydraulic circuit to relieve the pressure when it exceeds 700 bar.

The air pressure was applied to hydraulic fluid surrounding the piston until it failed by bursting and the hydraulic fluid leaked. The PPS piston burst in the range of 500 to 600 bar pressure.

Endurance Test

The endurance test was conducted by reciprocating the piston in a fixture bore at different temperature and pressure cycles.

The test apparatus consisted of an environmental chamber to control temperature and a hydraulic unit capable of applying a hydraulic pressure to the piston and controlling the applied pressure for a specific period of time. A computerized controller was used to measure, monitor and control the temperature and pressure cycles using a closed loop control system. The piston was cycled in the fixture bore for 40,000 cycles. The temperature range into which the piston was exposed to was −40° C. to +125° C. and the pressure range which the piston was exposed to was 0 to 200 bar.

In addition to the information provided from the testing of various pps materials, the following characteristics of the pps materials were examined:

1. Shrinkage of the pps material during plastic injection molding of the piston.
2. Compatibility of the pps piston material with brake fluid and its resistance against swelling when exposed to brake fluid.
3. High temperature and low temperature properties of pps at +125° C. −40° C.

In view of the above tests and other listed characteristics which were considered, Thermocomp OF100-10 is the preferred material for fabricating the pistons of the present invention.

By constructing the high pressure accumulator piston from pps material, there is a significant cost saving over the prior art which taught constructing such a piston from aluminum or the like. This cost savings is realized both in material costs and labor associated with fabrication techniques. Aluminum pistons must be machined and plated with chromium or the like to prevent corrosion. In contrast, the pps material is impervious to the corrosive effects of hydraulic fluid and can be molded to the precise tolerance needed in the application.

Figure 3:
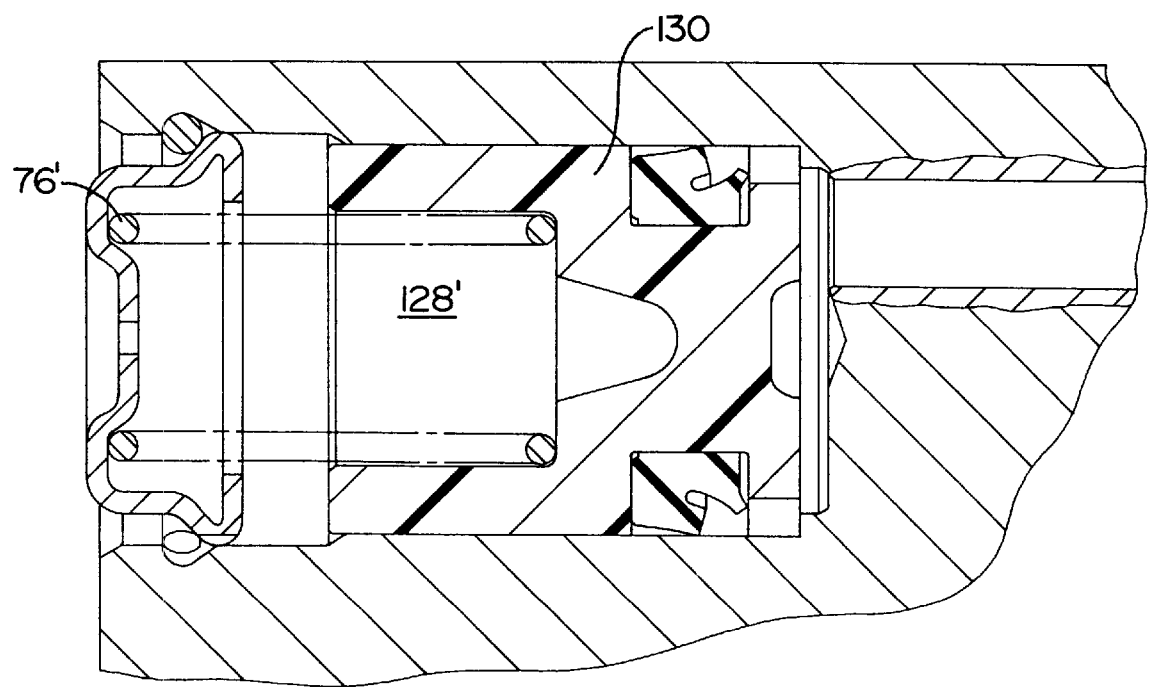
FIG. 3, is a cross-sectional view of the second embodiment of the high pressure accumulator of the present invention.

Now referring to FIG. 3, a second embodiment of the piston of the present invention is disclosed in most respects, piston 130 is identical to piston 72. The primary exception is piston 130 has a central void 128' which is counter bored to accept spring 76'. By placing spring 76' within void 128', it is possible to use an inexpensive stamped steel cap to retain the spring and piston which further reduces the overall cost of accumulator 60.

The foregoing detailed description shows that the preferred embodiments of the present invention are well suited to fulfill the objects of the invention. It is recognized that those skilled in the art may make various modifications or additions to the preferred embodiments chosen here to illustrate the present invention, without departing from the spirit of the present invention. Accordingly, it is to be understood that the subject matter sought to be afforded protection hereby, should be deemed to extend to the subject matter defined in the appended claims, including all fair equivalence thereof.

I claim:

1. A high pressure accumulator for use in an anti-lock brake system, said high pressure accumulator comprising:
   a housing having walls defining a chamber,
   a piston residing in said chamber, wherein said piston is comprised of approximately 50% by volume polyphenylene sulfide and includes glass fibers.

2. The high pressure accumulator of claim 1, wherein said polyphenylene sulfide includes minerals.

3. The high pressure accumulator of claim 1 wherein the relative relationship between glass fibers and polyphenylene sulfide is generally 50% by volume.

4. The high pressure accumulator of claim 1, wherein said polyphenylene sulfide piston further comprises glass fibers and minerals and wherein the relationship between said glass fibers, minerals, and polyphenylene sulfide is 20%, 30%, and 50% respectively by volume.

5. The high pressure accumulator of claim 1, wherein said polyphenylene sulfide piston includes a head portion and a wall portion extending away from the head portion, said wall portion defining an inner chamber.

6. The high pressure accumulator of claim 5, further including a spring disposed in said inner chamber.

7. The high pressure accumulator of claim 5, further including a flange portion extending radially outwardly from at least one of said head portion and said wall portion.

8. The high pressure accumulator of claim 7, further including a spring disposed upon said flange portion.

9. The high pressure accumulator of claim 5, wherein said wall is defined by an inner surface and an outer surface wherein said inner and outer surfaces are oblique.

10. The high pressure accumulator of claim 9, wherein said inner surface generally defines a void having an oblate semi-spherical geometry.

11. An antilock brake system, comprising:
    a master cylinder,
    at least one wheel cylinder, having a hydraulic port,
    a hydraulic connection between said master cylinder and said hydraulic port of said wheel cylinder,
    a pump having a suction side and a high pressure side, wherein said suction side is connected to said hydraulic port of said wheel cylinder,
    a high pressure accumulator hydraulically connected to said high pressure side of said pump, wherein said high pressure accumulator includes a housing having walls defining a chamber and a piston residing in said chamber wherein said piston is comprised of approximately 50% by volume polyphenylene sulfide and includes glass fibers.

12. The high pressure accumulator of claim 11, wherein said polyphenylene sulfide piston includes minerals.

13. The high pressure accumulator of claim 11, wherein said polyphenylene sulfide piston further comprises glass fibers and wherein the relative relationship between glass fibers and polyphenylene sulfide is generally 50% by volume.

14. The high pressure accumulator of claim 11, wherein said polyphenylene sulfide piston further comprises glass fibers and minerals and wherein the relationship between said glass fibers, minerals, and polyphenylene sulfide is 20%, 30%, and 50% respectively by volume.

15. The high pressure accumulator of claim 11, wherein said polyphenylene sulfide piston includes a head portion and a wall portion extending away from the head portion, said wall portion defining an inner chamber.

16. The high pressure accumulator of claim 15, further including a spring disposed in said inner chamber.

17. The high pressure accumulator of claim 15, further including a flange portion extending radially outwardly from at least one of said head portion and said wall portion.

18. The high pressure accumulator of claim 17, further including a spring disposed upon said flange portion.

19. The high pressure accumulator of claim 15, wherein said wall is defined by an inner surface and an outer surface wherein said inner and outer surfaces are oblique.

20. The high pressure accumulator of claim 19, wherein said inner surface generally defines a void having an oblate semi-spherical geometry.

* * * * *